(12) United States Patent
Sato

(10) Patent No.: US 7,644,092 B2
(45) Date of Patent: Jan. 5, 2010

(54) SYSTEM FOR MANAGING DATA ON MEMORY DEVICE USING FILE SYSTEM

(75) Inventor: Yasunori Sato, Shizuoka-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 939 days.

(21) Appl. No.: 11/121,404

(22) Filed: May 3, 2005

(65) Prior Publication Data

US 2006/0253616 A1 Nov. 9, 2006

(51) Int. Cl.
*G06F 7/00* (2006.01)
*G06F 17/00* (2006.01)

(52) U.S. Cl. .................. 707/101; 707/200; 711/153

(58) Field of Classification Search ............. 707/1–10, 707/100–104.1, 200–206; 711/5, 101–103, 711/147–148, 153, 155; 386/91
See application file for complete search history.

(56) References Cited

U.S. PATENT DOCUMENTS 6,070,174 A * 5/2000 Starek et al. ............... 707/206
7,024,532 B2 * 4/2006 Takagi et al. .............. 711/163
2005/0005059 A1 * 1/2005 Tanaka et al. ............. 711/103

OTHER PUBLICATIONS

Drakopoulos et al., Performance analysis of client-server storage systems, Nov. 1992, IEEE, vol. 41, 1442-1452.*
Yong Chen et al., CoStore: a reliable and highly available storage system using clusters, Jun. 16-19, 2002, IEEE, 3-11 (Total 9 pages).*

* cited by examiner

*Primary Examiner*—Jean B Fleurantin
(74) *Attorney, Agent, or Firm*—Patterson & Sheridan, LLP

(57) ABSTRACT

A file management system comprises a free-cluster queue describing cluster information indicating a cluster of a memory device in which "data has not been deleted yet but a file will be written preferentially only when a file write request is received"; means deleting, via a preferential input/output request queue in a driver, management information of data according to a deletion request for a file; means selecting either a non-preferential input/output request queue or the free-cluster queue to which the cluster information of the cluster in which the file whose management information has been deleted; means setting the cluster information of the data to which the deletion request is given, to either the non-preferential input/output request queue or the free-cluster queue, depending on selected results; and means providing the cluster information set in the free-cluster queue to a preferential input/output request queue of the driver, when a predetermined event occurs.

19 Claims, 7 Drawing Sheets

A CHAIN NUMBER 011 FOR THE NEXT FAT IS WRITTEN AT THIS FAT NUMBER 010.

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 00 | FF0 | FFF | FFF | 004 | 005 | 006 | 007 | 008 | FFF | 00A | 00B | 00C | 00D | 00E | 00F | FFF |
| 01 | 011 | 012 | 013 | 014 | FFF | 016 | 017 | 018 | 019 | 01A | 01B | 01C | 01D | 01E | 01F | FFF |
| 02 | 021 | 022 | 023 | 024 | 025 | 026 | 027 | 028 | 029 | 02A | 02B | 02C | 02D | 02E | 02F | FFF |
| 03 | 031 | 032 | 033 | 034 | 035 | 036 | FFF | 038 | 039 | 03A | FFF | 03C | 03D | 03E | 03F | FFF |
| ⋮  |     |     |     |     |     |     |     |     |     |     |     |     |     |     |     |     |
| BF | BF1 | BF2 | BF3 | BF4 | FFF | BF5 | BF6 | BF7 | FFF | BFA | BFB | BFC | BFD | BFE | BFF | FFF |

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 00 | FF0 | FFF | FFF | 004 | 005 | 006 | 007 | 008 | FFF | 00A | 00B | 00C | 00D | 00E | 00F | FFF |
| 01 | FF0 | FF0 | FF0 | FF0 | FF0 | 016 | 017 | 018 | 019 | 01A | 01B | 01C | 01D | 01E | 01F | FFF |
| 02 | 021 | 022 | 023 | 024 | 025 | 026 | 027 | 028 | 029 | 02A | 02B | 02C | 02D | 02E | 02F | FFF |
| 03 | 031 | 032 | 033 | 034 | 035 | 036 | FFF | 038 | 039 | 03A | FFF | 03C | 03D | 03E | 03F | FFF |
| ⋮  |     |     |     |     |     |     |     |     |     |     |     |     |     |     |     |     |
| BF | BF1 | BF2 | BF3 | BF4 | FFF | BF5 | BF6 | BF7 | FFF | BFA | BFB | BFC | BFD | BFE | BFF | FFF |

SYSTEM FOR MANAGING DATA ON MEMORY DEVICE USING FILE SYSTEM

BACKGROUND OF THE INVENTION

1. Technical Field of the Invention

The present invention relates to a computer system, and in particular, to a file management system that uses a file system in order to manage data on a memory medium of a memory device incorporated in this computer system.

2. Related Art

In general, computers or systems with computers have memory devices to memorize data therein. The technique for managing data memorized in those memory devices is called file system and the file system is provided as one of the functions owned by an operating system (OS). Hence, each operating system uses a different file system. The file system is in charge of setting of a technique to register data, the location of a region to be managed, and how to use the region, in addition to produce folders (directories) in memory devices and files and transferring and deleting the folders.

Because the file system may conceptually include management regions defined on a memory medium and information in relation to the management, the file system will be understood in such broad manner set forth herein below. In addition, the memory device means devices including hard disks, floppy disks and CD-ROMs. In those memory devises, data is managed in blocks such that plural sectors (for example, four sectors) of data are handled as one cluster to be managed block by block. The file is referred as a gathering of data recorded in a memory device. The operating system manages such data file by file. Each file is made up of data (actual data) composing actual contents of this file and management information (file management information) used to manage the data.

When a file is deleted (removed) in the conventional file system, it is usual that file management information is solely deleted from a recording medium in a memory device, wherein practical data (i.e., actual data) of each file are left in sectors on the recording medium. This means that, until such sectors are used again on the recording medium, that is, new data are overlaid on such sectors, the original data, which have been thought by users that they are already deleted, are left as they are in the recording medium. Therefore, in cases where the memory devices such has hard disks are disposed of, there is certainly a risk that private information and/or company information are leaked from such memory devices which are thought to be disposed of.

With taking such a risk into consideration, file systems in which security for the information leakage is improved have been known as well. In those file systems, all sectors themselves in which actual data of files are stored (in the conventional common file systems, it was unnecessary to delete such actual data) are deleted by overlaying predetermined fixed data thereon. This deleting operation results in increases in the access frequency to recording mediums such as hard disk depending on how frequently the deletion operations are performed, which provides a poor access performance.

SUMMARY OF THE INVENTION

Accordingly, in view of the situations with which the foregoing conventional file system confronts, the present invention provides a file system in which deleting actual data of a file and access performance associated with the deletion are balanced with each other.

According to the present invention, there is provided a file management system for managing read and write of a file consisting of data and management information for the data when the file is memorized cluster by cluster into a memory device, the system comprising: a driver that is in charge of performing the read and write of the file into and from the memory device and that responds to both of a preferential input/output request queue to perform the write preferentially and a non-preferential input/output request queue not to perform the write preferentially; a free-cluster queue describing cluster information indicating a cluster of the memory device in which "data has not been deleted yet but a file will be written preferentially only when a file write request is received"; management-information deleting means for deleting, via the driver, the management information of data in accordance with a deletion request for a file memorized in the memory device; queue selecting means for selecting either the non-preferential input/output request queue or the free-cluster queue to which the cluster information of the cluster in which the file whose management information has been deleted by the management-information deleting means should be set; queue setting means for setting the cluster information of the data to which the deletion request is given, to either the non-preferential input/output request queue or the free-cluster queue, depending on selected results of the queue selecting means; and queue managing means for providing the cluster information set in the free-cluster queue to the preferential input/output request queue of the driver, when a predetermined event occurs.

In the present invention, the "file" referred in the present invention is a block composed of data recorded on recording mediums, such as hard disks, floppy disks, CD-ROMs, and also the unit of data to be managed by an operating system (OS). In addition, the "file system" referred in the present invention is a technique for managing data recorded in memory devices.

DETAILED DESCRIPTION OF PREFERRED EMBODIMENT

Referring to FIGS. 1 to 10, an embodiment of the present invention will now be described.

Figure 1:
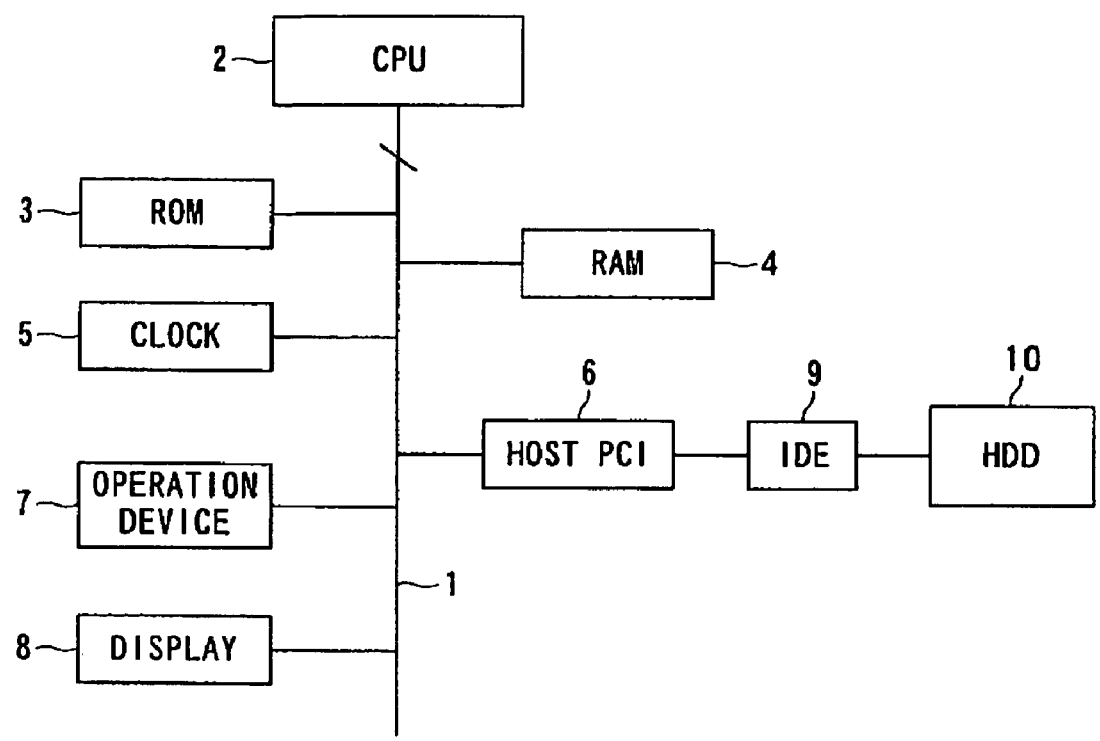
FIG. 1 is a block diagram outlining a computer system to which a file management system according to the present invention is reduced into practice.

FIG. 1 outlines a file management system according to the present invention, in which a method and a system for managing data on a memory device using a file system are reduced into practice.

The file system executed in this file management system is, for example, an FAT (File Allocation Table) file system, and more practically, is a DOS (Disk Operating System) file system which typically represents one type of the FAT file system.

As shown in FIG. 1, the file management system is provided with a CPU (Central Processing Unit) 2, a ROM (Read-Only Memory) 3, a RAM (Random Access Memory) 4, a clock generator 5, a host PCI (Peripheral Component Interconnect) 6, an operation device 7, and a display 8, which are connected with one another via a bus 1 so that necessary data are communicable thereamong. Moreover, the host PCI 16 is communicably connected with an HDD (Hard Disk Drive) 10 via an IDE (Integrated Drive Electronics) driver 9. As shown, in the present embodiment, the file management system is composed of a personal type of computer.

As a modification, this file management system may be composed of a larger type of computer system, in which the foregoing host PCI 6, IDE driver 9 and HDD 10 are replaced by a combined configuration of an IDE driver connected to the bus 1 and an HDD connected to such an IDE driver via an IDE bus.

In this file management system, the CPU 2 is designed to execute programs read out from the ROM 3, so that the CPU 2 can serve as a main component for managing various types of processing including access to files (data files) stored in the HDD, deletion of the files, and production of new files to be stored in the HDD. The ROM 3 memorizes program data to be executed by the CPU 2 and a variety of types of fixed data. The RAM 4 functions as a memory device temporarily preserving data handled during a process in which the CPU 2 executes the management of files.

Figure 2:
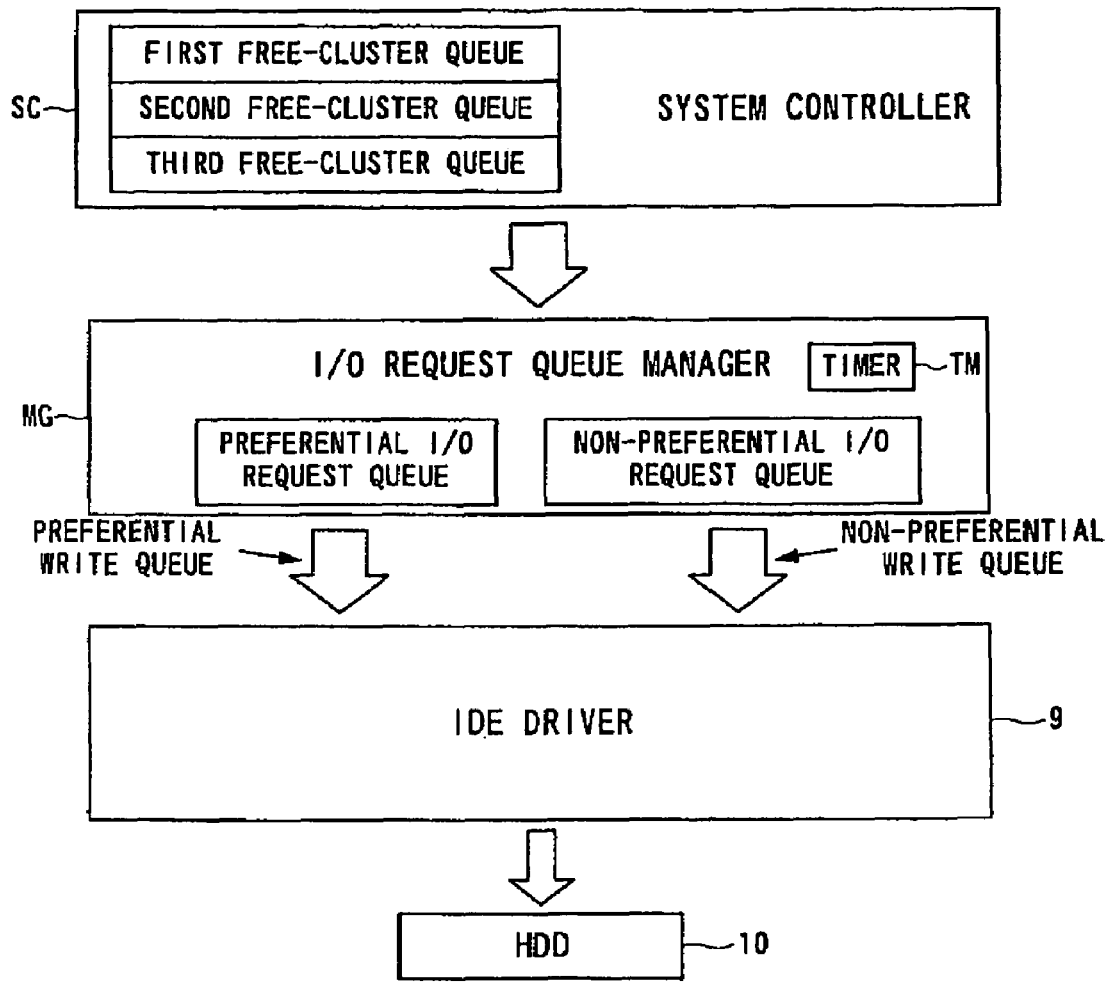
FIG. 2 is a block diagram showing a DOS file system serving as the file management system.

Hence the CPU 2, ROM 3, RAM 4, clock generator 5, host PCI 6, IDE driver 9, and HDD 10 operate cooperatively in such a manner that those components functionally form a DOS file system, as illustrated in FIG. 2. Of these the CPU 2, ROM 3, RAM 4, and clock generator 5 form, in terms of its functions, both of a system controller SC and an I/O (input/output) request queue manager MG.

In addition to the forgoing file management, the system controller SC, when being activated, responds by managing a queue for free clusters in the HDD 10 and an I/O request queue to and from the IDE driver 9, which feature the present invention as well.

The host PCI 6 serves as an interface to change data between the bus 1 and the IDE driver 9. The IDE driver 9 drives the HDD 10 to input and output data into and from the HDD. Further, the HDD 10 stores therein file data in a writable and readable manner. Both the operation device 7 and the display 8 function as a man-machine interface.

Referring to FIG. 2 showing a functional block diagram, the DOS file system will now be described.

Figure 3:
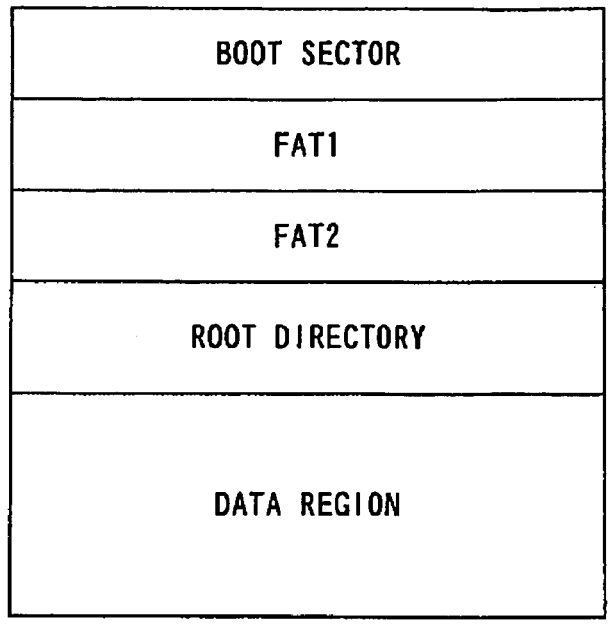
FIG. 3 is a pictorial illustration showing the configuration of a disk used by the DOS file system.

In terms of its generalized explanation, the DOS file system has a disk structured into, as shown in FIG. 3, three blocks consisting of a boot sector, FATs 1 and 2, and a root directory and managed based on those three blocks.

The boot sector is a block to be made reference by a BIOS (Basic Input/Output System), when an OS (Operating System) is stored into this disk. Each of the FAT1 and FAT2 is a block called "File Allocation Table," which is a table showing how data to be stored as files are structured in the form of clusters of the disk (the cluster is a block that collects several sectors to be recognized by the file system). Meanwhile the root directory is a part where information indicative of the top of the hierarchy which is a tree structure owned by this file system.

The operations performed in the DOS file system according to the present embodiment will now be described, in order to show how files stored in the HDD 10 are accessed and deleted.

(Access Operation)

An access operation made by the DOS file system will first be described. For the sake of simplified description, assume that files to be accessed are present in the root directory.

In this DOS file system, the system controller SC first tries to acquire directory information from file bus information owned by the DOS file system. Since a file to be accessed is present in the root directory in this case, the system controller SC is able to acquire directory information showing the file to be accessed from the root directory.

Figure 4:
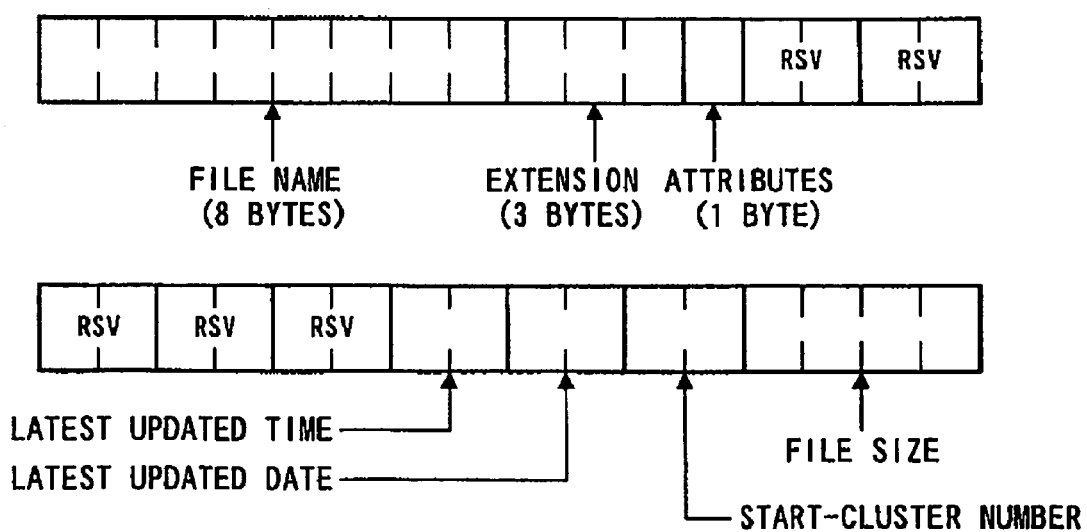
FIG. 4 is an illustration of root directory information.

The directory information is structured as shown in FIG. 4. Important information necessary for accessing files is a cluster start number. This directory information includes, in a written form, the number of the first cluster in which a file to be accessed is written. When acquiring the start cluster number, the system controller SC acquires information showing an FAT corresponding to the number.

This FAT includes the next cluster number, in cases where the file is formed to continue to the next cluster. If data written in the FAT is 0xFFF, the data of the current cluster becomes the final data.

To specify a range of effectiveness of data belonging to the final cluster, the system controller SC uses information indicative of a file size. For example, in an FAT shown in FIG. 5, assume that the directory information of a file shown by "aaa." Txt shows a start cluster number of 010, an FAT address corresponding to the start cluster address 010 is accessed. A cluster number 011 is written at the accessed FAT address, so the system controller SC makes access to another FAT address corresponding to the next cluster address 011. Further, another cluster number 012 is written at the accessed FAT address, whereby an access is made to another FAT address specified by the next cluster number of 012. These procedures are repeated, which finds that a number FFF is written at a cluster number of 014 in the FAT. As a result, the DOS file system is able to recognize that a chain of clusters having the data of the file to be searched currently has ended at this address.

Thus, through the procedures described above, the system controller SC acquires pieces of information in relation to the chain of clusters having the data of a file, and uses this chain information to access to data actually stored in the HDD 10.

(Production of File)

Next, an operation to produce a new file in this DOS file system will be described.

Now assume that a file of bbb.txt is produced in the root directory. In this DOS file system, the system controller SC first tries to find a free directory entry in the root directory. If the free directory entry is found out, the controller writes "bbb" into a part serving as the file name of the directory entry, txt into a part serving as the expander of the directory entry, and a current time and date into parts serving as the latest update time and the latest updated date of the directory entry by obtaining the current time and date using system functions prepared by the OS.

The system controller SC then refers to a file size, so that the controller recognizes that two clusters are required to write the data of a file. Thus the system controller SC obtains two free clusters from queues managing the free cluster numbers. From the two cluster numbers obtained, the controller selects a cluster number to be used at the head of a file, before the controller writes the selected cluster number as a start cluster number of the directory entry information. The DOS file system writes chain information indicative of this file at locations of the FAT addressed by the numbers of clusters to be used.

Then, to write in actual file data, the controller sets both sector numbers and actual data both of which are written in an I/O request queue of the IDE driver (i.e., preferential write queue, which will be described later) and issues an command to execute an I/O request. Since the I/O request has already been issued, the IDE driver uses the queue information to write the file data into the actual sectors.

In the actual DOS file system, some other procedures using a disk cache system and others intervene between the system controller and the IDE driver, which makes the operations more complicated than the above. In this embodiment, however, those complicated explanations are omitted.

(Deletion of File)

An operation to delete files in the present DOS file system will now be described. For the sake of more simplified description, the deletion of the foregoing file "aaa.txt" will now be described in connection with FIGS. 9 and 10.

Figures 5, 6, 7:
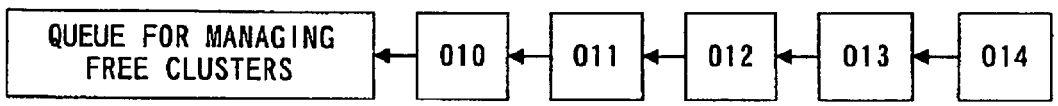
FIG. 5 is an illustration of an FAT.
FIG. 6 is an illustration of a chain of empty clusters.
FIG. 7 is an illustration of the FAT.

The system controller SC of the DOS file system which has been received a command for deleting the file "aaa.txt," (step S1 in FIG. 9) acquires directory information in relation to the file. The start cluster number given by the directory information is 010. Hence the system controller SC makes reference to the FAT table, whereby it is recognized that, as shown in FIG. 6, this file consists of clusters of 010, 011, 012, 013, to 014.

Thus the system controller SC writes, into locations in the FAT specified by the corresponding addresses, data to command free blocks (i.e., deletion), so that the locations of the FAT addressed in accordance with those clusters are free blocks. In this case, the data to be written is 0xFFO. The system controller SC then adds, to a free list shown in FIG. 7, the cluster numbers which have been used in the file deleted this time (step S2). The free list is used for making it faster for searching free blocks.

The file is deleted in the above manner. Accordingly, even after the deletion, there remain the data in the clusters in which the actual file data of the HDD 10 are stored.

In this way, regardless of having deleted a file, the fact that actual data of the file is kept in the HDD 10 may cause worries in security. To overcome this situation, the DOS file system according to the present invention, in which the present invention is reduced into practice, will provide the following countermeasures as to deletion of files.

Some queues which are significant for deleting operations unique in the present embodiment will now be described in their configurations.

Figure 8:
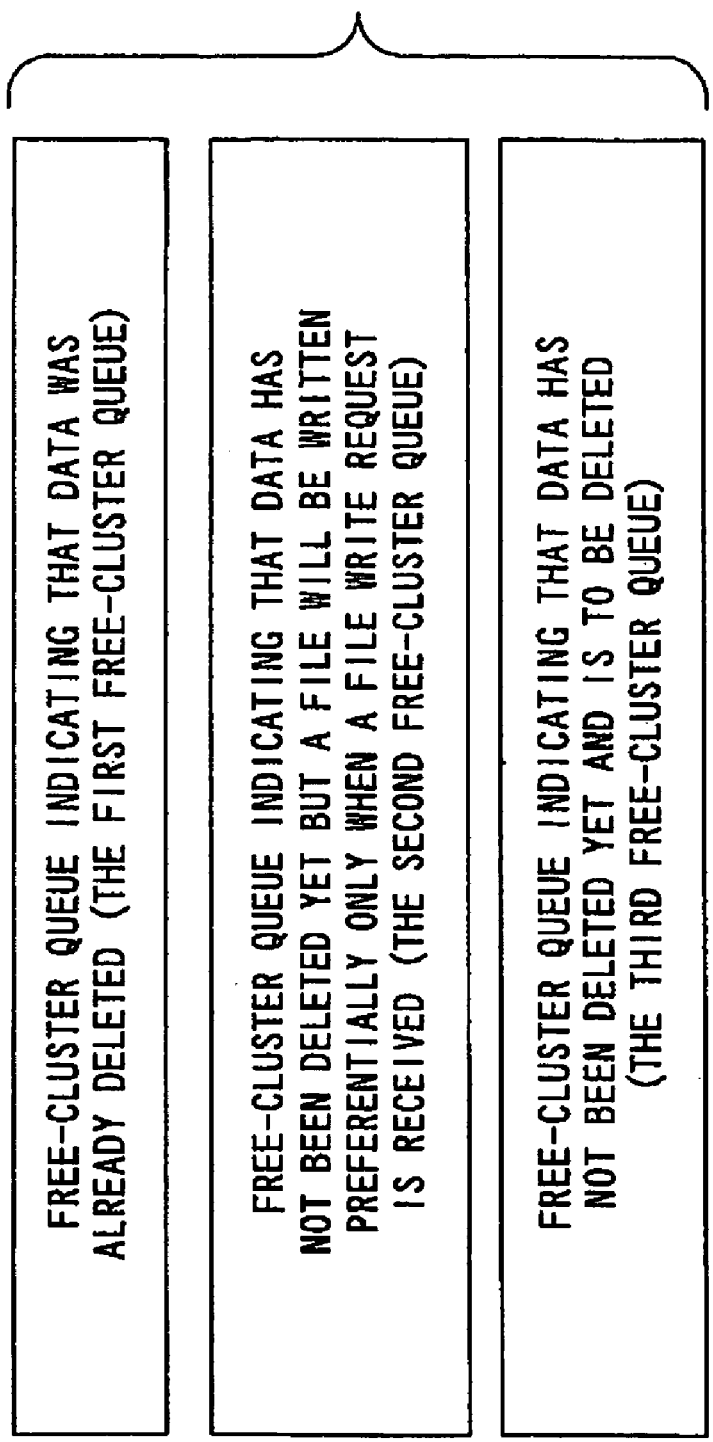
FIG. 8 is an illustration of empty cluster cues.

The first point is to divide queues indicating free clusters into three types for their management, as shown in FIG. 8. The three types of queues are:

a "free-cluster queue indicating that data was already deleted" (hereinafter, this queue is referred to as a "first free-cluster queue");

a "free-cluster queue indicating that data has not been deleted yet but a file will be written preferentially only when a file write request is received" (hereinafter, this queue is referred to as a "second free-cluster queue.");

a "free-cluster queue indicating that data has not been deleted yet and is to be deleted" (hereinafter, this queue is referred to as a "third free-cluster queue.").

These queues are managed by the system controller SC.

Among these queues, the first free-cluster queue is for managing clusters (i.e., blocks) in which fixed data is actually written in (i.e. the data has been deleted) so that the clusters are recognized as being vacant (i.e., free) through writing the fixed data in it. The second free-cluster queue is for managing clusters (i.e., blocks) to which file data are assigned preferentially to the other clusters when a new file is requested to be written in. In other words, overlaying the file data will cause the currently written data to be deleted. Further, the third free cluster queue is for managing clusters (i.e., blocks) that are not managed by the second free-cluster queue and are to be deleted necessarily by the DOS file system when this system is brought into its deleting operation.

The second point is that, as illustrated in FIG. 2, an I/O request queue to the IDE driver 9 is composed of two types of queues; a "preferential I/O request queue" and a "non-preferential I/O request queue." These "preferential I/O request queue" and "non-preferential I/O request queue" are managed by an I/O request queue manager MG.

Under the above queue configurations, the system controller SC operates as below. As shown in FIG. 7, the cluster into which 0xFFO has been written, that is, the freed vacant cluster (step S2 in FIG. 7) is subjected to the processing performed by the system controller SC such that a random function and other necessary means are utilized to determine whether or not a queue indicating the freed cluster is loaded to the "second free-cluster queue" (step S3). The determination reveals an affirmative answer, the queue indicating the freed cluster is loaded to the "second free cluster queue."(step S4). However, the determined result shows that the queue indicating the freed cluster will not be loaded to the "second free-cluster queue," the queue indicating the freed cluster is loaded to a non-preferential I/O request queue to the IDE driver 9 (step S5).

During this condition, receiving a new file write request (step S6) allows the system controller SC to write in the data of the file that has been requested, into the clusters controlled by the "second free-cluster queue" (step S8), because the second free-cluster queue includes information showing a free cluster(s) (step S7). Practically, this request is converted to an I/O request, and loads the I/O converted request to the preferential I/O request together with the data of the file.

Thus, in the similar to the foregoing file producing operation, the I/O request queue manager MG responds to this queue loaded to the preferential I/O request queue by sending a preferential write queue to the IDE driver 9 so as to write data in a cluster specified by the newly loaded queue with preference to other data. Hence, to the cluster specified by the queue loaded to the "second free-cluster queue," the new file data responding to the file write request is overlaid. The data which has remained so far at the specified cluster is deleted as the past data and the new data is written therein.

On the other hand, the system controller SC utilizes a timer or other necessary means to monitor the "second free-cluster queue" at intervals. To be specific, the controller monitors if or not the second free-cluster queue does not become free (empty), even when a specified interval of time has passed (steps S11 and S12, FIG. 10). As a result, in cases where the second free-cluster queue has not been freed because there has been no new file write request during the interval, the system controller SC produces an I/O request to command fixed data to be written in clusters specified by the queues which are currently present in the "second free-cluster queue" and loads the produced I/O request on a preferential I/O request queue in the I/O request queue manager MG (step S13). Instead of utilizing the specified interval of time, an action to turn off the power may be utilized to stimulate the determination whether or not the second free request queue is freed vacant and the whether or not the post-determination necessary operations should be performed.

The IDE driver 9 gives priority to processing of the I/O requests to be loaded to the preferential I/O request queue therein, so that the data according to such I/O requests are written in the disk with priority. Whenever the preferential I/O request queue becomes empty, the driver 9 searches the non-preferential I/O request queue therein for I/O requests. As a result, when it is found that there are some I/O requests in the non-preferential I/O request queue, the driver 9 processes such I/O requests. In this case, a timer TM (refer to FIG. 2) may be placed to measure that the non-preferential I/O request queue has not become empty during a specified period of time. If it is true, that is, the non-preferential I/O request queue has not become empty during the specified period of time, the I/O request queue manager MG may operate to shift the I/O requests currently remaining in the non-preferential I/O request queue to the preferential I/O request queue.

As described, the DOS file system according to the present embodiment is able to make balance between the deletion of file data and a deterioration in the access performance associated with the deletion, so that the file system and the file management method which are improved in both security and endurance can be provided.

Specifically, in deleting file data, the predetermined processing is performed to determine whether or not a request queue should be loaded to the "free-cluster queue indicating that data has not been deleted yet but a file will be written preferentially only when a file write request is received" (the second free-cluster queue). And, concerning with such clusters specified by request queues to be loaded to the second free-cluster queue, the next chance when a file is written is utilized so that both the deletion and the write of data are performed at the same time.

Data of files requested to be deleted are thus actually deleted at considerable frequencies. However, it is not also true that data is immediately deleted whenever requests for the deletion are received. It is therefore possible to lower the frequencies of access to particular clusters. In cases where it is found that file data has not been written during a specified period of time, the data in clusters specified by queues loaded to the second free-cluster queue are forcibly deleted on an elapse of the specified period of time. Accordingly, both the access performance and security of and for deletion (removal) of file data can be balanced with each other. Especially, the deleting operation may be performed every time when the power is put off, the security for HDDs to be disposed of can be strengthened considerably.

In order to decide which queue should be loaded to the second free-cluster queue, the random function is utilized by way of example, which makes it possible to reduce a biased loading operation for queues to be loaded to the second free-cluster queue (i.e., clusters). Inversely saying, access to clusters on the disk which are immediately deleted without loading on the second free-cluster queue can be averaged. Hence the disk can be raised in its resistance against the access.

Figure 9:
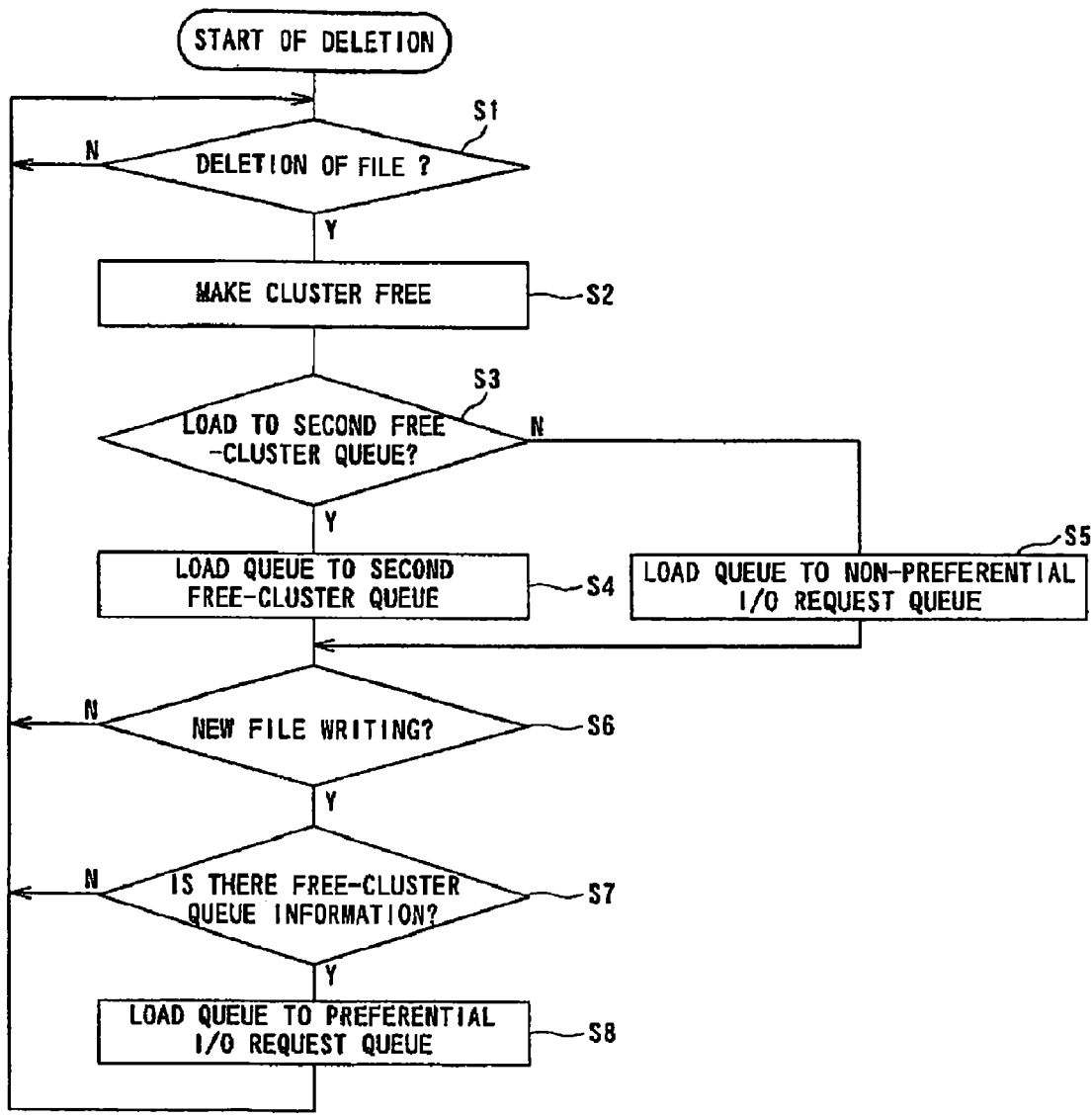
FIG. 9 is an outlined flowchart exemplifying processing for controlling the system;.
Figure 10:
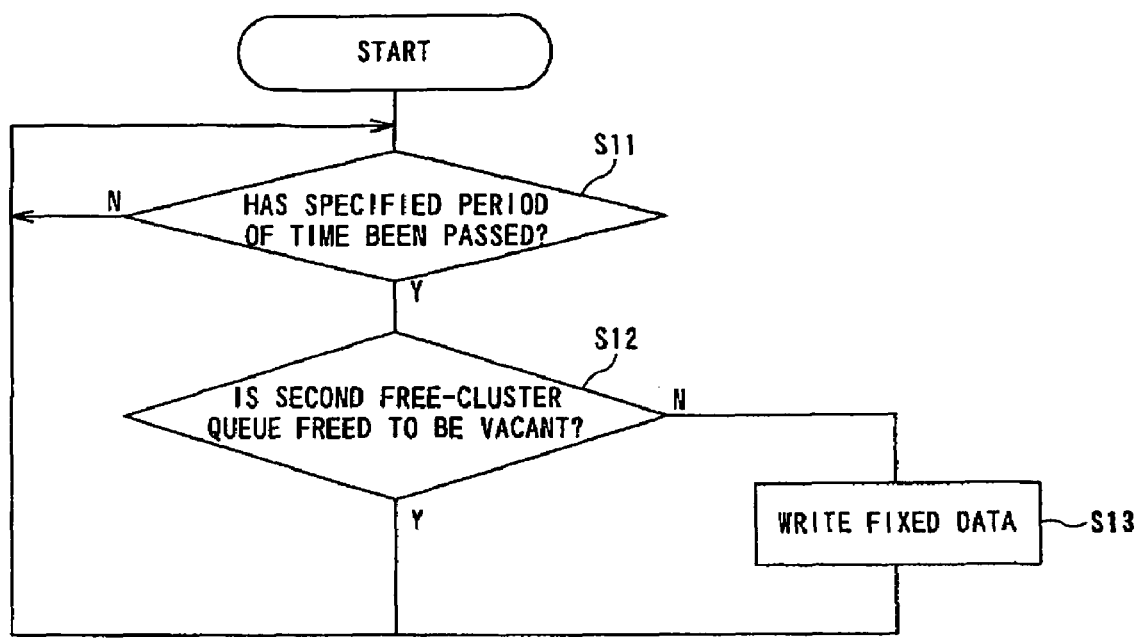
FIG. 10 is an outlined flowchart exemplifying another type of processing for controlling the system.

Moreover, as shown at step S3 in FIG. 9, the deleting operation of file data includes the step to determine whether either a queue indicating a cluster having data to be deleted should be loaded to the "second free-cluster queue" or the IDE driver 9 should be commanded to immediately delete data of a cluster by writing fixed data. If queues indicating all clusters having data to be deleted are loaded to the "second free-cluster queue" without such a selective determination step, the frequency of use of particular clusters will increases. However, in the present embodiment, the above selective determination makes it possible to prevent particular clusters from being accessed in a biased manner.

The present invention is not limited to only the configurations described in the above embodiment, but will be reduced into practice by the person skilled in the art using some modifications suitably structured without the gist of the appended claims.

What is claimed is:

1. A file management system for managing read and write of a file consisting of data and management information for the data when the file is stored cluster by cluster into a memory device, the system comprising:
    a driver that is in charge of performing the read and write of the file into and from the memory device and that uses a preferential input/output request queue to perform the write preferentially and a non-preferential input/output request queue not to perform the write preferentially;
    a free-cluster queue describing cluster information indicating a cluster of the memory device in which previously written data is stored and has not been overwritten yet and will be preferentially overwritten when a file write request is received;
    management-information deleting means for deleting, via the driver, the management information of data in accordance with a deletion request for a file stored in the memory device;
    queue selecting means for selecting either the non-preferential input/output request queue or the free-cluster queue to which the cluster information of the cluster in which the file whose management information has been deleted by the management-information deleting means should be set;
    queue setting means for setting the cluster information of the data to which the deletion request is given, to either the non-preferential input/output request queue or the free-cluster queue, depending on selected results of the queue selecting means; and
    queue managing means for providing the cluster information set in the free-cluster queue to the preferential input/output request queue of the driver, when a predetermined event occurs, wherein the queue managing means comprises:
    a first determining means for determining whether or not the predetermined event occurs;
    a second determining means for determining whether or not the cluster information is in the free-cluster queue, in cases where the first determining means determines that the predetermined event occurs; and
    preferential deletion commanding means for providing, in cases where the second determining means determines that the cluster information is in the free-cluster queue, the determined cluster information to the preferential input/output request queue of the driver.

2. The file management system of claim 1, wherein the queue selecting means is configured to use a random function to select either the non-preferential input/output request queue or the free-cluster queue to which the cluster information should be set.

3. The file management system of claim 1, wherein the first determining means is configured to determine a new write of the data, wherein the predetermined event corresponds to the new write.

4. The file management system of claim 1, wherein the first determining means is configured to periodically measure a specified period of time during an operating state of the system, wherein the predetermined event corresponds to the measurement of the specified period of time.

5. The file management system of claim 1, wherein the first determining means is configured to determine a shutdown of the system, wherein the predetermined event is the shutdown.

6. The file management system of claim 1, wherein the driver comprises non-preference determining means for determining whether or not cluster information is in the non-preferential input/output request queue continuously during a specified period of time; and transfer means for transferring the cluster information to the preferential input/output request queue when the non-preference determining means determines that the cluster information has been in the non-preferential input/output request queue continuously during the specified period of time.

7. The file management system of claim 1, wherein the deletion of the data of the file that is subjected to the deletion request, which is performed in the memory device, is overwriting the data with either predetermined fixed data or data associated with a new write request.

8. A file management system for managing read and write of a file consisting of data and management information for the data when the file is stored cluster by cluster in a memory device, the system comprising:
 a driver that is in charge of performing the read and write of the file into and from the memory device and that uses a preferential input/output request queue to perform the write preferentially and a non-preferential input/output request queue not to perform the write preferentially;
 a free-cluster queue describing cluster information indicating a cluster of the memory device in which previously written data is stored and has not been overwritten yet and will be preferentially overwritten when a file write request is received;
 management-information deleting unit configured to delete, via the driver, the management information of data in accordance with a deletion request for a file stored in the memory device;
 queue selecting unit configured to select either the non-preferential input/output request queue or the free-cluster queue to which the cluster information of the cluster in which the file whose management information has been deleted by the management-information deleting unit should be set;
 queue setting unit configured to set the cluster information of the data to which the deletion request is given, to either the non-preferential input/output request queue or the free-cluster queue, depending on selected results of the queue selecting unit; and
 queue managing unit configured to provide the cluster information set in the free-cluster queue to the preferential input/output request queue of the driver, when a predetermined event occurs, wherein, the queue managing unit comprises:
 a first determining unit configured to determine whether or not the predetermined event occurs;
 a second determining unit configured to determine whether or not the cluster information is in the free-cluster queue, in cases where the first determining unit determines that the predetermined event occurs; and
 preferential deletion commanding unit configured to provide, in cases where the second determining unit determines that the cluster information is in the free-cluster queue, the determined cluster information to the preferential input/output request queue of the driver.

9. The file management system of claim 8, wherein
 the queue selecting unit is configured to use a random function to select either the non-preferential input/output request queue or the free-cluster queue to which the cluster information should be set.

10. The file management system of claim 8, wherein
 the first determining unit is configured to determine a new write of the data, wherein the predetermined event corresponds to the new write.

11. The file management system of claim 8, wherein
 the first determining unit is configured to periodically measure a specified period of time during an operating state of the system, wherein the predetermined event corresponds to the measurement of the specified period of time.

12. The file management system of claim 8, wherein
 the first determining unit is configured to determine a shutdown of the system, wherein the predetermined event is the shutdown.

13. The file management system of claim 8, wherein the driver comprises
 non-preference determining unit configured to determine whether or not cluster information is in the non-preferential input/output request queue continuously during a specified period of time; and
 transfer unit configured to transfer the cluster information to the preferential input/output request queue when the non-preference determining unit determines that the cluster information has been in the non-preferential input/output request queue continuously during the specified period of time.

14. The file management system of claim 8, wherein the deletion of the data of the file that is subjected to the deletion request, which is performed in the memory device, is overwriting the data with either predetermined fixed data or data associated with a new write request.

15. A file management method for managing read and write of a file consisting of data and management information for the data when the file is stored cluster by cluster in a memory device, the method comprising:
 performing the read and write of the file with a driver into and from the memory device, wherein a preferential input/output request queue is used to perform preferential writes and a non-preferential input/output request queue is used to perform non-preferential writes;
 describing cluster information in a free-cluster queue, the cluster information indicating a cluster of the memory device in which previously written data is stored and has not been overwritten yet and will be preferentially overwritten when a file write request is received;
 deleting, via the driver, the management information of data in accordance with a deletion request for a file stored in the memory device;
 selecting either the non-preferential input/output request queue or the free-cluster queue to which the cluster information of the cluster in which the file whose management information has been deleted in the deleting should be set;
 setting the cluster information of the data to which the deletion request is given, to either the non-preferential input/output request queue or the free-cluster queue, depending on selected results in the selecting; and
 providing the cluster information set in the free-cluster queue to the preferential input/output request queue of the driver, when a predetermined event occurs, wherein, the providing further comprises:
 first determining whether or not the predetermined event occurs;

second determining whether or not the cluster information is in the free-cluster queue, in cases where the first determining determines that the predetermined event occurs; and providing, in cases where the second determining determines that the cluster information is in the free-cluster queue, the determined cluster information to the preferential input/output request queue of the driver.

16. The method of claim 15, wherein
the selecting uses a random function to select either the non-preferential input/output request queue or the free-cluster queue to which the cluster information should be set.

17. The method of claim 15, wherein
the first determining determines a new write of the data, wherein the predetermined event corresponds to the new write.

18. The method of claim 15, wherein
the first determining periodically measures a specified period of time during an operating state of the system, wherein the predetermined event corresponds to the measurement of the specified period of time.

19. The method of claim 15, wherein
the first determining determines a shutdown of the system, wherein the predetermined event is the shutdown.

* * * * *